C. H. LINDSTROM.
DECAPITATING SHEARS.
APPLICATION FILED OCT. 29, 1913.
1,117,068.
Patented Nov. 10, 1914.
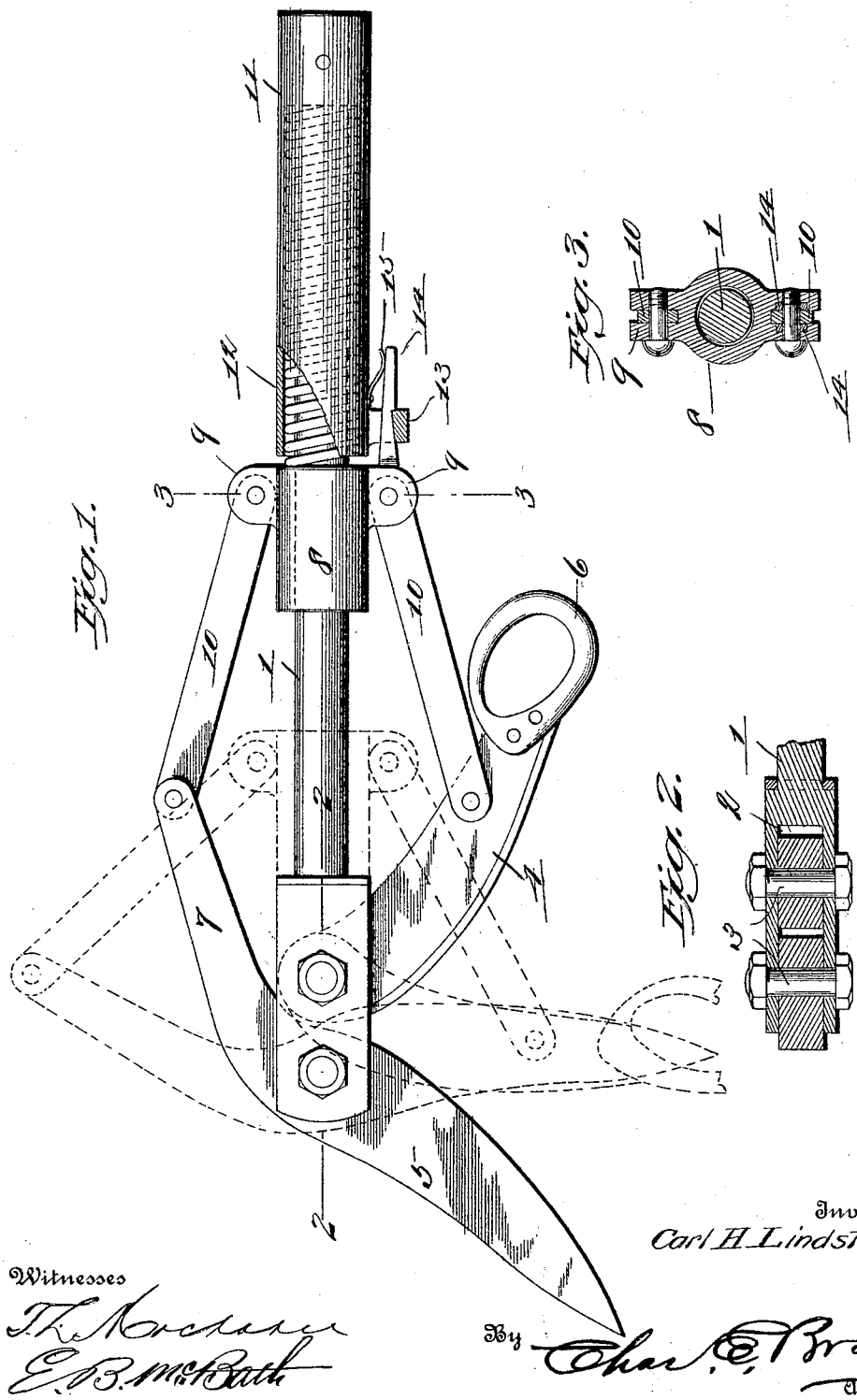
Inventor
Carl H. Lindstrom
By Chas. E. Brock
Attorney
Witnesses

UNITED STATES PATENT OFFICE.

CARL H. LINDSTROM, OF MILLTOWN, NEW JERSEY.

DECAPITATING-SHEARS.

1,117,068. Specification of Letters Patent. Patented Nov. 10, 1914.

Application filed October 29, 1913. Serial No. 798,038.

*To all whom it may concern:*

Be it known that I, CARL H. LINDSTROM, a citizen of the United States, residing at Milltown, in the county of Middlesex and State of New Jersey, have invented a new and useful Improvement in Decapitating-Shears; of which the following is a specification.

This invention relates to decapitating shears designed to be employed for the purpose of killing poultry and the object of the invention is to enable the user to quickly behead the fowl without resorting to the ordinary crude method of decapitation by means of the hatchet.

The invention consists in the novel features of construction hereinafter described, pointed out in the claims and shown in the accompanying drawings, in which, Figure 1 is a side elevation partly broken away and in section, showing the cutting blades in full lines in open position and showing by dotted lines the position of the parts when said blades are closed. Fig. 2 is a section on the line 2—2 of Fig. 1. Fig. 3 is a section on the line 3—3 of Fig. 1.

In the drawings, 1 represents a shank the forward end of which is widened and bifurcated as indicated at 2. Pivoted pins 3 pass transversely through the bifurcated portion and upon said pins are mounted co-acting cutting blades 4 and 5 respectively. The blade 4 is provided with a finger ring portion 6, while the blade 5 has a normally rearwardly extending arm 7. A sleeve 8 is slidably mounted upon the shank 1 and carries suitable lugs 9 formed in pairs, and between the lugs of each pair is pivotally mounted a link 10. One of these links is pivotally connected to the blade 4 and the other link is pivotally connected to the arm 7, so that as the sleeve 8 moves along the shank 1 toward the enlarged bifurcated portion 2 the blades 4 and 5 will be brought together in a shearing action.

Mounted upon the rear end of the shank 1 is a suitable tubular handle portion 11, within which is arranged a coil spring 12 adapted to bear upon the sleeve 8 and to force the same toward the front end of the shank 1.

In order to lock the parts in open position and hold the sleeve 8 in position adjacent the handle portion 12 I form upon one side of said handle portion a bracket 13 and pivotally connected to the sleeve 8 is a trigger 14 provided with a suitable shoulder, which trigger is adapted to pass through the bracket and a spring 15 holds the shoulder formed upon the trigger against the rear face of the bracket. This trigger is preferably bifurcated at its forward end and mounted upon the same pivot pin which connects one of the links 10.

The operation and manner of using the device will be clearly obvious from the above description and the drawings.

What I claim is:—

1. A device of the kind described comprising a shank, co-acting cutting blades pivotally mounted upon the same and arranged transversely with respect thereto, a spring pressed sleeve slidable upon the shank, links pivotally connected respectively to said blades and to said sleeve, and means for locking the blades in open position.

2. A device of the kind described comprising a shank having a handle portion, co-acting cutting blades transversely and pivotally carried by the shank, one of said blades having a rearwardly extending arm, a sleeve slidable on the rod, links pivotally connected to the sleeve, one of said links being pivotally connected to said arm, the other link being connected to the other blade, a spring adapted to actuate said sleeve and a locking trigger carried by said sleeve and adapted to lock the same against movement when the blades are in open position.

3. A device of the kind described comprising a shank having a bifurcated front end portion, cutting blades pivoted in said bifurcation, one of said blades having a rearwardly extending arm, a tubular handle upon the rear end of the shank, a coil spring in said handle and projecting therefrom, a sleeve upon the shank upon which said spring bears, a bracket carried by the handle, a trigger carried by the sleeve and adapted to lock in said bracket, and links pivotally carried by opposite sides of the sleeeve, said links being respectively pivotally connected to one blade and to the arm of the other blade.

4. A device of the kind described comprising a shank having its front end portion bifurcated, cutting blades pivotally mounted in said bifurcation and extending laterally with respect to said shank, an arm carried by one of said blades, said arm extending rearwardly with respect to the shank and upon the side opposite that of the cutting blades, a sleeve slidable upon the shank, a spring actuating said sleeve, means for locking said spring under tension, and links pivoted to opposite sides of the sleeve, one of said links being pivotally connected to the blade arm, and the other link being pivotally connected to the other blade, the said blade having a handle portion formed upon its extreme end.

CARL H. LINDSTROM.

Witnesses:
F. O. LINDSTROM,
Mrs. JOS. A. HEADLEY.